Nov. 22, 1966 J. E. FLEMING 3,287,656

VARIABLE FREQUENCY MICROWAVE DISCRIMINATOR

Filed Nov. 18, 1964 2 Sheets-Sheet 1

INVENTOR

James Evans Fleming

BY Glenn S. Ovrevik

AGENT

VARIABLE FREQUENCY MICROWAVE DISCRIMINATOR

Filed Nov. 18, 1964 2 Sheets-Sheet 2

INVENTOR
James Evans Fleming
BY Glenn S. Ovrevik
AGENT

United States Patent Office 3,287,656

Patented Nov. 22, 1966

3,287,656
VARIABLE FREQUENCY MICROWAVE DISCRIMINATOR

James E. Fleming, Fairfax, Va., assignor to Keltec Industries, Inc.

Filed Nov. 18, 1964, Ser. No. 412,122
3 Claims. (Cl. 331—16)

This invention relates in general to microwave devices and in particular to variable frequency discriminator devices.

Numerous frequency discriminator devices have been devised for use at microwave frequencies. In most instances these prior art microwave devices have been patterned after low frequency devices of like nature and as a rule in such instances, the resultant structure has had inherent operational disadvantages. For examples, one typical microwave discriminator incorporates two tuned cavities tuned to slightly different frequencies with ganged tuning means to permit tracking. It is well recognized by those skilled in the art that this type of microwave discriminator has precision accuracy requirements which magnify the cost and that the its size and reliability characteristics leave something to be desired. In addition this type of device has operational limitations in that each cavity operates on the skirts of the responsive curve and bandwidth variation will distort the curves.

Another typical prior art discriminator embodies a single cavity which is modulated by an external source. This relatively complex device is not continuously responsive but rather operates on a sampled data basis. Moreover, it has been found that the external source may introduce objectionable noise into the system.

It will be appreciated that a frequency discriminator operable in the microwave range have a reliable discriminator response over a relatively wide frequency range which is compact and inexpensive and thus avoids many disadvantages of the prior art is needed and would be welcomed as a substantial advancement of the art.

Accordingly:

It is an object of this invention to provide a microwave discriminator which may be tuned over a relatively wide frequency range.

It is also an object of this invention to provide a microwave discriminator which is continuously responsive over its characteristic frequency band.

It is another object of this invention to provide a microwave discriminator which is electronically tunable.

It is a further object of this invention to provide a microwave discriminator which is substantially insensitive to bandwidth deviations.

It is an additional object of this invention to provide a frequency control system having a high degree of stability.

It is still another object of this invention to provide a frequency control system which is electronically tunable.

Other objects of this invention will become apparent upon a more comprehensive understanding of the invention for which reference is had to the following specification, claims and the drawings wherein:

Figure 1:
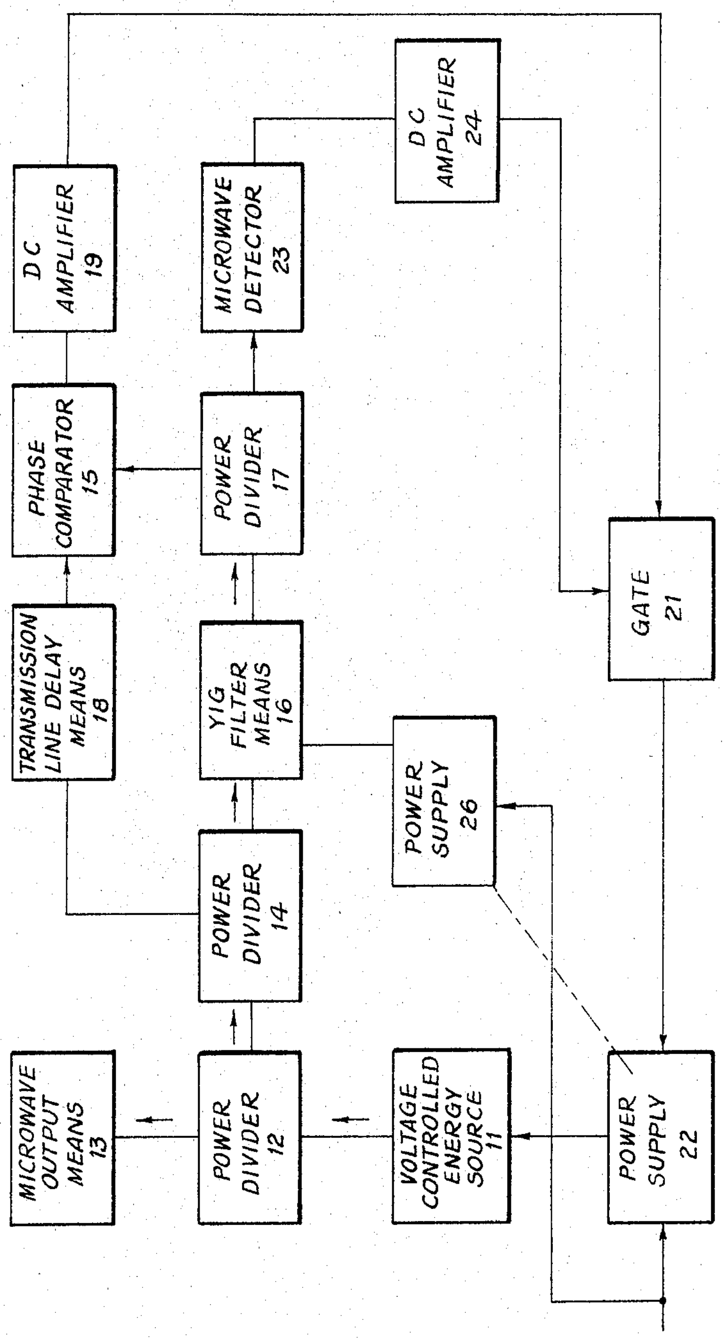
FIGURE 1 is a block diagram of one embodiment of the device of this invention in an error signal application.

Briefly, the device of this invention affords a continuous phase comparison of microwave energy at the output terminals of two paths, one of which includes a tunable yig filter means, such that undesired frequency deviations of a wave energy source may be determined and corrected automatically.

Referring now to the drawings:

FIGURE 1 shows a typical embodiment of the device of this invention, a microwave energy source 11, a first power divider 12 for continuous sampling of the signal energy applied to the output means 13, which may be, for example, the mixer circuit in the front end of a receiver. The sampled energy is applied via a second power divider 14 to the two inputs of a phase comparator means 15. One of the two input paths to the phase comparator means 15 includes a yig filter means 16 of the type containing yttrium, iron and garnet, and a third power divider 17 and the other of the two paths includes transmission line delay means 18 such that the effective lengths of the two input paths between the second power divider 14 and the phase comparator means 15 are electrically identical and balanced.

The output of the phase comparator means 15 is applied via a D.C. amplifier means 19 and a gate 21 to an input of a high voltage, low current power supply 22 which, in this embodiment, determines the output frequency of the microwave energy source 11. The gate 21 and the D.C. amplifier means 19 are not essential to the operation of this invention, of course, but may be incorporated, as shown, in conjunction with a detector 23 and another D.C. amplifier 24 to preclude application of a control signal to the power supply 22 in the absence of a signal in the output of the yig filter 16.

In a typical embodiment the first power divider 12 may separate out any useable fraction of the energy source 11 output signal, the second power divider 14 may divide 10 to 1 with the greater portion directed to the path including the relatively lossy yig filter, and the third power divider 17 may separate out any fraction suitable for amplification by D.C. amplifier means 19 to operate the gate 21.

Likewise, the yig filter 16 may be a conventional ferrite tuned circuit device wherein the tuned center frequency is determined by the level of energization of electromagnetic field producing means associated therewith. This electromagnetic field producing means, indicated at 26 in the drawing, may include a low voltage high current power source which is ganged, as shown, to vary the magnitude of the output of the two power sources in unison. It will be appreciated, of course, that the voltage controlled energy source 11 may be a conventional backward wave oscillator, a solid state klystron such as described in the copending application of Theodore Geiszler et al. entitled Broadband Solid State Microwave Energy Source, Serial No. 381,455 which was filed July 9, 1964 or any other voltage controlled oscillator device.

Obviously, the general power requirements of the selected voltage controlled energy source determines the type of power source 22 to be employed. In this invention, however, the frequency linearity characteristic of the voltage controlled energy source is established not by the selected energy source but by the frequency linearity characteristic of the yig filter employed. As is recognized by those skilled in the art, the yig filter has a highly stable output at any selected energization center and the frequency is variable in direct constant relation to the electrical energization thereof. This invention utilizes the linear frequency characteristic of the yig filter and the phase characteristic to either side of the center frequency, as well, and thus permits far greater latitude in the selection of the oscillator. Consequently, in many applications, factors other than frequency linearity over the desired bandpass may have paramount importance.

Referring now to the operation of the device, with the circuit properly adjusted and with the yig filter 16 tuned to the frequency of the energy source 11, the output of the phase comparator means 15 is normally zero. As the output of the power supplies 22 and 26 are varied the tuned center frequency of the yig filter 16 will vary accordingly in a linear relation but the output frequency of the energy source 11 may vary otherwise. With energy source 11 output differing substantially from the tuned center frequency of the yig filter 16, the energy separated out by the second power divider 14 will not be within the narrow pass band of the yig filter 16 and therefore will not pass. Thus the detector 23 will not produce an output and the normally open gate 21 will remain open.

With the energy source 11 output differing slightly from the exact tuned frequency of the yig filter 16 (within the pass band), however, energy will pass the yig filter 16 with a change in phase proportion to deviation from the tuned center frequency, the detector 23 will produce an output which, when amplified by the amplier 24, will close the gate 21. At the same time, the output of the signal comparator means 15 will reflect the phase difference in input signals via the two paths and this representative output signal will pass via the closed gate 21 to vary the output power source 22 which in turn varies the frequency of the voltage controlled energy source 11 such that the output frequency thereof approaches the tuned center frequency of the yig filter. As the frequency of the energy source 11 approaches the tuned center frequency of the yig filter, the yig filter has a lesser effect on the phase of the energy pass therethrough and the output of the signal comparator means decreases accordingly. Likewise, the rate of change in output frequency of the voltage controlled energy source 11 decreases, in turn, until the "in track" relation is obtained. Whereupon, the system continues to correct for non linear frequency variation in a continuing electronic servo manner.

Figure 2:
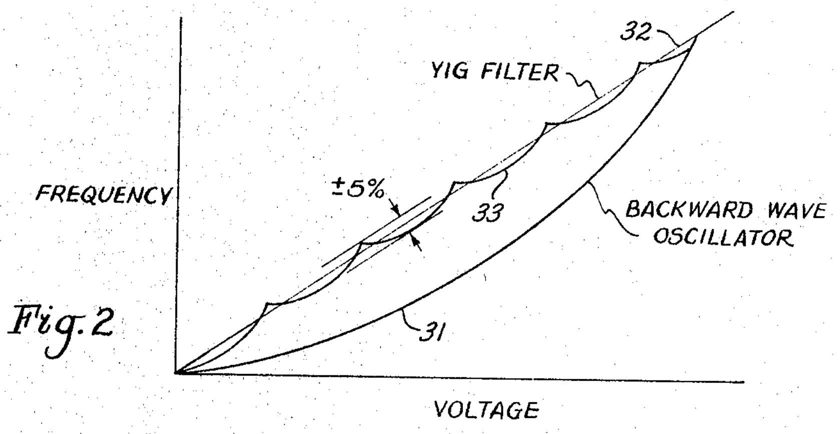
FIGURE 2 is a graphic showing of a voltage versus frequency characteristic curve for a backward wave oscillator and a yig filter.

FIGURE 2 is a graphical presentation of the frequency versus voltage characteristic of a typical voltage controlled oscillator, a backward wave oscillator, indicated at 31 and the tuned center frequency versus voltage characteristic of a typical yig filter, indicated at 32. It will be noted that the yig filter characteristic curve is substantially linear over the selected frequency range whereas the characteristic curve of the backward wave oscillator is an exponential curve.

FIGURE 2 also shows a curve 33 superimposed on the linear characteristic curve of the yig filter. Curve 33 depicts the characteristic curve of the backward wave oscillator under the corrective influence of the device of this invention as the oscillator is swept across its frequency band. It will be noted that the deviations from the linear characteristic curve 31 are with an approximate 5 percent range. This range is determined by several factors, including the sweep rate and the $\varphi$ of the yig filter either of which can be altered, of course, as desired in selected applications.

Figure 3:
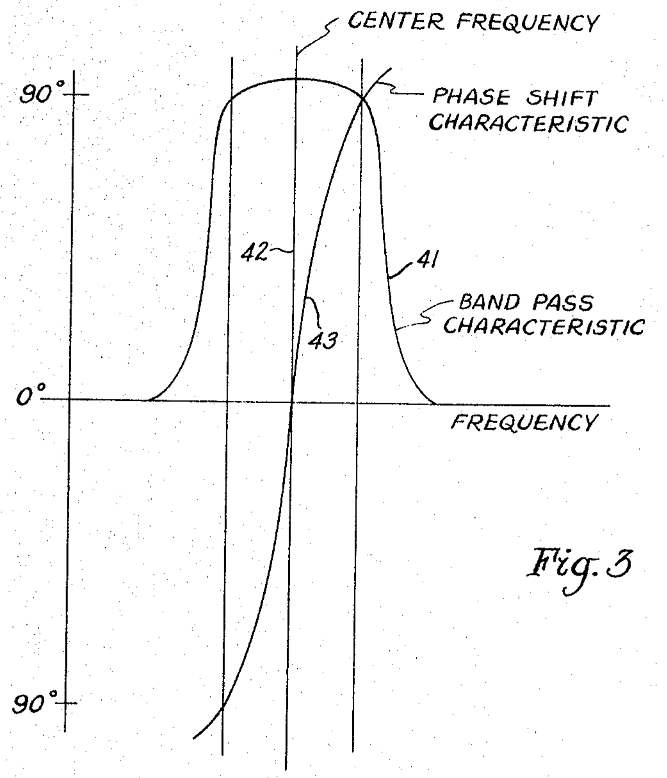
FIGURE 3 is a graphic showing of a typical yig filter phase shift characteristic within the bandpass of the filter.

FIGURE 3 is a graphical presentation of frequency versus phase shift for a yig filter of the variety employed in the illustrative embodiments which further demonstrates the operation of the device of this invention. In FIGURE 3, the bandpass curve 41 is substantially symmetrical about a center frequency indicated at 42. The phase shift curve 43 depicts a phase shift of +90 degrees and −90 degrees about the center frequency 42. Thus, as discussed heretofore in reference to the embodiment of FIGURE 1, an input signal passing through the yig filter at the center frequency experiences no phase shift whereas an off frequency signal within the bandpass experiences a degree of phase shift dependent upon the frequency.

While the device of this invention has been exemplarily shown in a preferred embodiment in FIGURE 1, it will be appreciated that wide departures from this embodiment are within the purview of this disclosure. For example, it is not essential that the phase comparator produce a minimum signal when the voltage controlled oscillator 11 and the center frequency of the yig filter 16 are in unison, and the gate 21 may be other than normally open in selected applications. Furthermore, the transmission line delay means 18 may be either real time or artificial delay means and in some instances may constitute the inherent delay in a cascade connection of conventioal coaxial connectors. Furthermore, the output of the comparator means 15 may be connected to any suitable input of the power supply 22 and it is not essential that the power supply 22 include a separate input for this purpose.

It will be appreciated that the device of this invention may be greatly simplified in a manual application and that the output of the phase comparator means 15 may be a conventional voltage indicator means, not shown, if desired.

It has been found that the device of this invention has greatly increased reliability as compared with other prior art devices for the same purpose by significant reductions in the number of components. Likewise, it has been found that the mechanically and/or electronically tunable device of this invention is much more versatile than other known devices.

Finally, it is understood that this invention is only limited by the scope of the claims appended hereto.

What is claimed is:

1. In a variable frequency microwave energy system, a wave energy source of the energization dependent output frequency variety; variable energization means adapted to energize said wave energy source such that the output frequency is variable within a selected frequency band; first power divider means having at least one input and at least first and second outputs; means for applying a portion of the output of said wave energy source to said input of said first power divider means; phase comparator means having at least first and second inputs and at least one output; first wave energy transmission means interconnecting said first output of first power divider means and said first input of said phase comparator means; second wave energy transmission means interconnecting said second output of said first power divider means and said second input of phase comparator means; said first wave energy transmission means including a tunable yig filter adapted to tune over said frequency band; first control means adapted for varying said variable energization means; second control means, nonresponsive to said first control means, adapted for tuning said yig filter means and for varying said variable energization means in tracking relation; output utilization means connected to said output of said phase comparator means and responsive to a difference in frequency between the output of said wave energy source and the tuned frequency of said yig filter means and means connecting said output utilization means to said first control means for varying said variable energization means in response to said difference in frequency such that said difference in frequency is minimized.

2. The structure as defined in claim 1 wherein said second wave energy transmission means includes transmission line delay means adapted to introduce a balanced delay in said first and second wave energy transmission means.

3. The structure as defined in claim 2 wherein said means connecting said output utilization means to said first control means includes normally open gating means adapted to close in response to wave energy at said first input of said phase comparator.

References Cited by the Examiner

UNITED STATES PATENTS

| | | | |
|---|---|---|---|
| 2,065,565 | 12/1936 | Crosby | 331—1 |
| 2,777,955 | 1/1957 | Gabor | 331—1 |
| 3,010,073 | 11/1961 | Melas | 331—1 |
| 3,116,463 | 12/1963 | Singer | 331—9 |
| 3,197,714 | 7/1965 | Prevallet | 331—1 |

FOREIGN PATENTS

| | | |
|---|---|---|
| 56,137 | 9/1952 | France. |

NATHAN KAUFMAN, *Primary Examiner.*

J. KOMINSKI, *Assistant Examiner.*